United States Patent
Cotta

(10) Patent No.: US 9,838,201 B2
(45) Date of Patent: Dec. 5, 2017

(54) SECURE KEY STORE DERIVATION AND MANAGEMENT FROM A SINGLE SECURE ROOT KEY

(71) Applicant: Sony Computer Entertainment America LLC, San Mateo, CA (US)

(72) Inventor: Bryan Cotta, San Mateo, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 174 days.

(21) Appl. No.: 14/882,230

(22) Filed: Oct. 13, 2015

(65) Prior Publication Data

US 2017/0104585 A1    Apr. 13, 2017

(51) Int. Cl.
*G06F 21/00* (2013.01)
*H04L 9/06* (2006.01)
*G06F 12/14* (2006.01)
*G06F 12/02* (2006.01)

(52) U.S. Cl.
CPC ............ *H04L 9/0631* (2013.01); *G06F 21/00* (2013.01); *G06F 12/0246* (2013.01); *G06F 12/1408* (2013.01); *G06F 2212/1052* (2013.01); *G06F 2212/7204* (2013.01)

(58) Field of Classification Search
USPC .......................................................... 713/193
See application file for complete search history.

(56) References Cited

U.S. PATENT DOCUMENTS

| 9,064,135 | B1 | 6/2015 | Poo et al. |
| 2011/0091037 | A1 | 4/2011 | Pinder |
| 2011/0255689 | A1 | 10/2011 | Bolotov et al. |
| 2012/0137137 | A1 | 5/2012 | Brickell et al. |
| 2013/0080764 | A1 | 3/2013 | Khosravi et al. |
| 2013/0282589 | A1* | 10/2013 | Shoup ............... G06F 21/34 705/67 |
| 2014/0189365 | A1 | 7/2014 | Cox et al. |
| 2014/0189890 | A1 | 7/2014 | Koeberl et al. |
| 2014/0270153 | A1 | 9/2014 | Scarpino et al. |
| 2015/0371055 | A1* | 12/2015 | Park ............... G06F 21/6218 713/165 |

OTHER PUBLICATIONS

"The security and performance of the Galois/counter mode of operation" by David McGrew et al; 21 pages, 2004.*

* cited by examiner

*Primary Examiner* — Jason Lee
(74) *Attorney, Agent, or Firm* — John L. Rogitz

(57) ABSTRACT

A root key of a computing device that is typically "burned" into the device hardware at time of manufacture is used to establish a master key and if desired a Transport Layer Security pre-shaped key, a WiFi configuration key, and application verification keys. The keys established from the root key are stored in a region of flash memory, and this region of flash memory is then encrypted using a random encryption code.

18 Claims, 3 Drawing Sheets

SECURE KEY STORE DERIVATION AND MANAGEMENT FROM A SINGLE SECURE ROOT KEY

TECHNICAL FIELD

The application relates generally to secure key store derivation and management from a single secure root key.

BACKGROUND

The proliferation of multimedia devices (e.g. Google Chromecast, Roku, Amazon FireTV, all of which are names are protected by trademarks) that access user accounts, WiFi passwords, contend and personally identifiable information (PII) has increased significantly. Most of the available offerings do not offer a way to securely store user secrets, account info, and PII. These devices are typically very low cost and security is an afterthought. Expensive security methods are not fully employed to protect the user, content provider, or device manufacturer.

SUMMARY

Accordingly, present principles address this need for secure storage of secrets. The present application describes deriving keys from a root key, while still allowing a "factory reset" or re-keying of all keys (except the root key) if necessary. The root key can be used to protect keys and secrets that belong to different entities such as: end user, content or app provider, and device manufacturer. Most devices are capable of cheaply creating and storing a single root key. Deriving other keys securely is done by ephemerally computing the key values. Raw key values are never stored in device storage or memory.

In one aspect, a device has a computer memory that is not a transitory signal and that In one aspect, a device has a computer memory that is not a transitory signal and that includes instructions executable by a processor to access a root key of a computing device, and use the root key to establish at least one derived key selected from: a master key component $S_M$, a Transport Layer Security pre-shared key component $S_T$, a Wifi configuration key component $S_W$, an application verification key component $S_A$. The instructions are further executable to store the derived key in a first region of a flash memory, with the first region being less than 100% of a total storage area of the flash memory. Also, the instructions are executable to encrypt the first region using a random encryption code.

In examples, the random encryption code includes advanced encryption standard (AES) XEX encryption mode. The AES XEX encryption mode can have tweak and ciphertext stealing (XTS) with a first tweak value equal to a key number of the derived key and a second tweak value equal to an AES block number.

Alternatively, the random encryption code can include Liskov, Rivest, Wagner (LRW) encryption, cipher block chaining-mask-cipher block chaining (CMC) encryption, or electronic codebook-mask-electronic codebook (EME) encryption.

In some implementations, the instructions can be executable to, upon first boot or derived key reset, generate a mask L, and establish an AES-XTS key using the mask L. The AES-XTS key may be used to encrypt the first region of the flash memory.

The first (encrypted) region can have a memory size of thirty two kilobytes (32 kB).

In another aspect, a method includes accessing a root key H of a computing device. The root key H is permanently stored on a secure hardware storage of the computing device. The method includes using the root key H to establish a master key M by combining the root key H with a pseudorandom benign key split, mathematically represented as follows:

$M = kdf(H, S_M)$, where kdf=key derivation function, H=root key, $S_M$=master key component. The master key is them used to encrypt a Transport Layer Security pre-shared key (TLS_PSK) component $S_T$, which in turn is used to establish an encrypted communication channel with a paired device. The memory further includes storing the master key component $S_M$ and the TLS_PSK component $S_T$ in an encrypted region of a memory.

In another aspect, an apparatus includes a processor and a memory accessible to the processor and including instructions executable by the processor for deriving, from a hard-coded, unchangeable root key H, a master key M and encrypting a communication key component using the master key M but not storing the master key M in an encrypted region of memory. The instructions are further executable for storing the communication key component encrypted by the master key M in the encrypted region of memory for use of the communication key component to establish a secure communication channel with a paired device. Moreover, the instructions are executable for storing a component $S_M$ of the master key M in the encrypted region of memory. This component $S_M$ of the master key M is defined by: $M = kdf(H, S_M)$, where kdf=key derivation function.

The details of the present application, both as to its structure and operation, can best be understood in reference to the accompanying drawings, in which like reference numerals refer to like parts, and in which:

DETAILED DESCRIPTION

Figure 1:
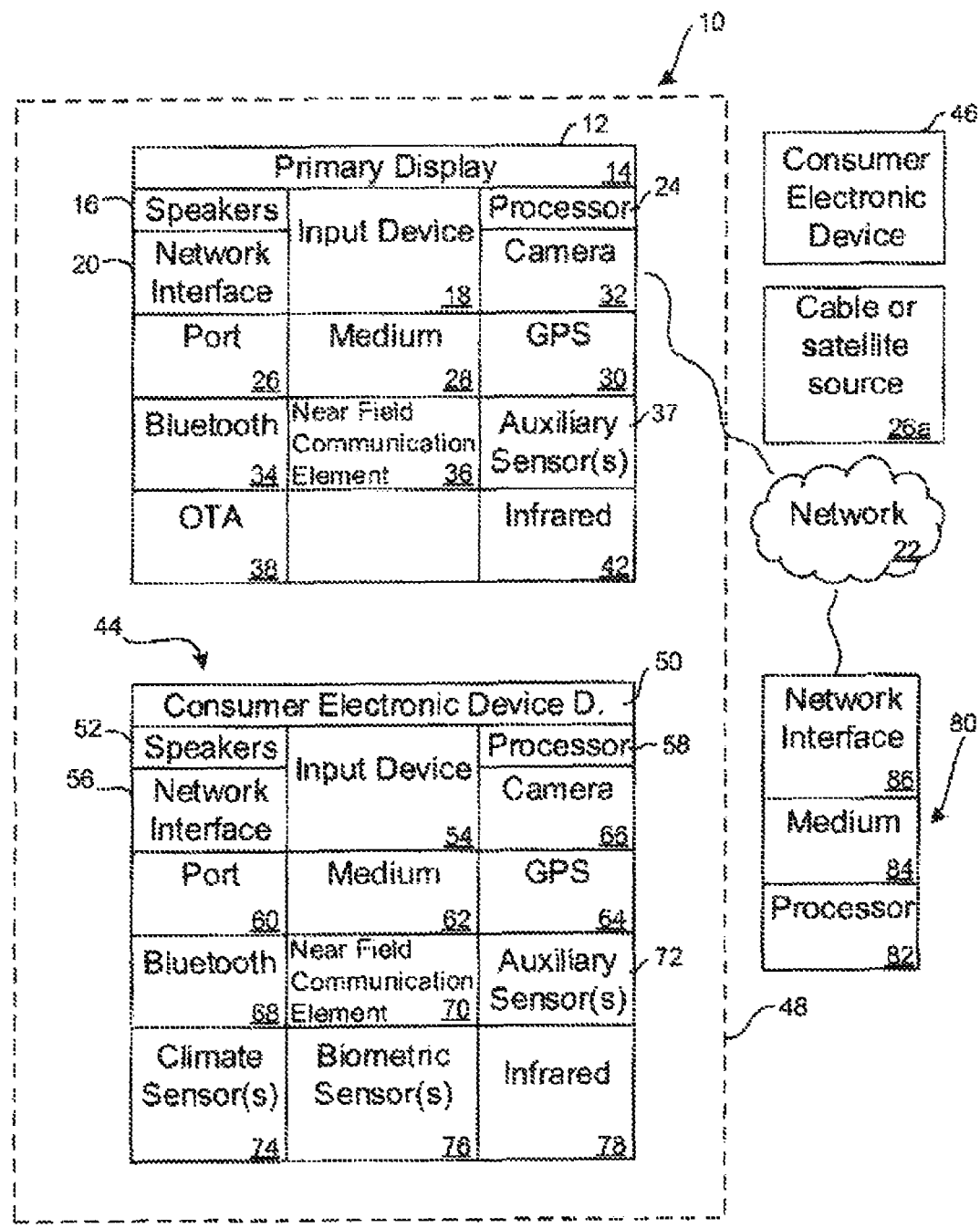
FIG. 1 is a block diagram of an example system including an example in accordance with present principles.

This disclosure relates generally to computer ecosystems including aspects of consumer electronics (CE) device networks such as but not limited to distributed computer game networks. A system herein may include server and client, components, connected over a network such that data may be exchanged between the client and server components. The client components may include one or more computing devices including game consoles suck as Sony Playstation™, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium, such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition, multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTH TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem, or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description, of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or rooter, Wi-Fi transceiver, or other appropriate interface such as, e.g., a wireless telephony transceiver. Typically, the server 80 includes multiple processors in multiple computers referred to as "blades".

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
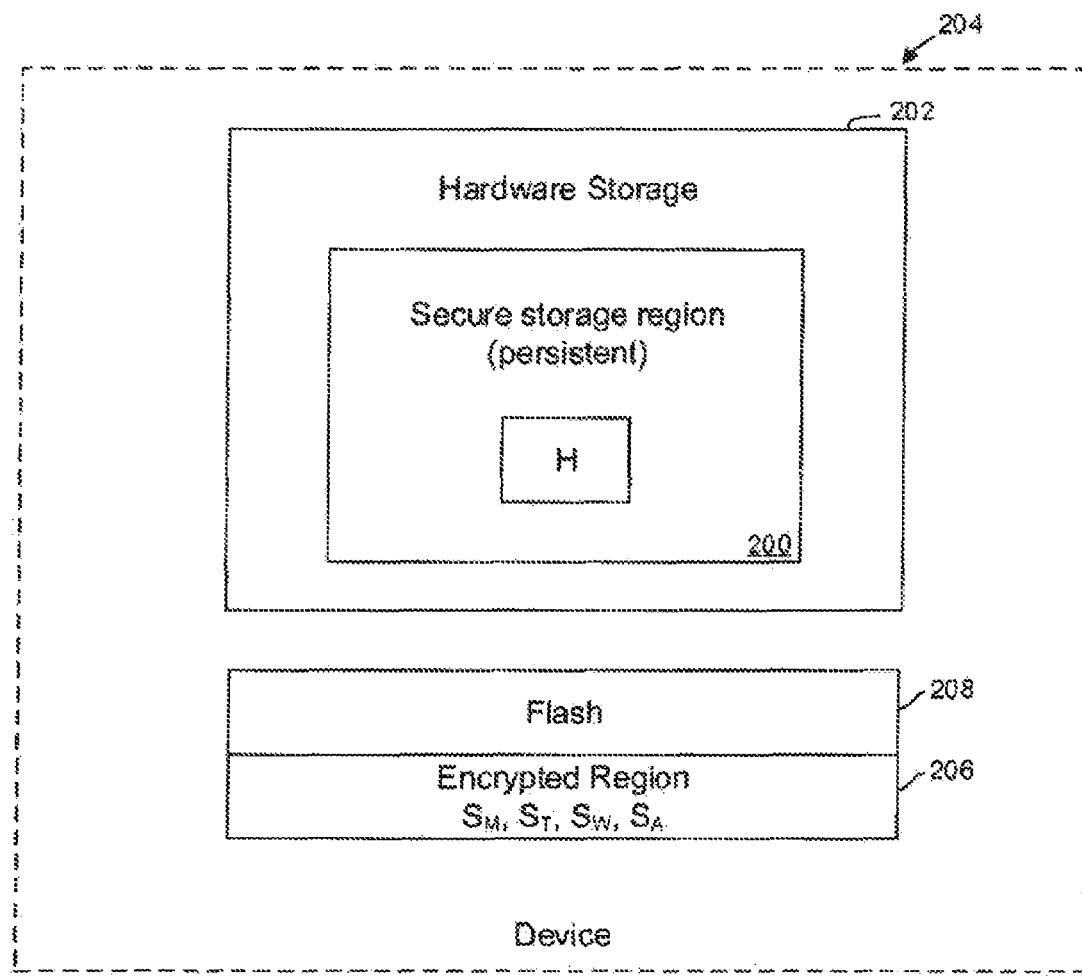
FIG. 2 is a schematic diagram of a flash memory with an encrypted key component storage region.

Turning to FIG. 2, an unchangeable hardware root key "H" is stored during manufacture in a secure region 200 of hardware storage 202 of a device 204 that may be implemented by any of the devices described above. In an example, the device 204 may be implemented by a multimedia device such as a game console (e.g., Playstation), Google Chromecast, Roku, Amazon FireTV, or other device executing a movie or multimedia application such as a Rio application.

The root key H can be implemented in secure manner that does not allow general reading, just derivation of other keys. The root key H is an encryption key that is permanently embedded in the secure storage region 200, which may be implemented as a Trusted Platform Module (TPM) security hardware, generally at the time of manufacture. The root key H is never released outside of the TPM; instead, a public portion of the root key H helps other devices to recognize a genome TPM. In an example, the root key H is implemented using eFuse techniques that "etch" or hard code the root key into the secure storage region 200.

As described further below, the root key H is used to establish various other keys, and these keys are stored in an encrypted region 206 of memory such as flash memory 208. As can be appreciated in reference to the schematic diagram of FIG. 2, the encrypted region 206 is typically less than 100% of the available storage space in the flash memory 208, and is greater than zero storage. In an example, the storage capacity of the encrypted region 206 may be thirty two thousand bytes (32 kB).

FIG. 2 designates each key derived from the root key H using the initial letter "S". These keys, which are wiped from memory upon factory reset, can include a master key component $S_M$, a Transport Layer Security pre-shared key component $S_T$, a Wifi configuration key component $S_W$, and one or more application verification keys $S_A$.

Figure 3:
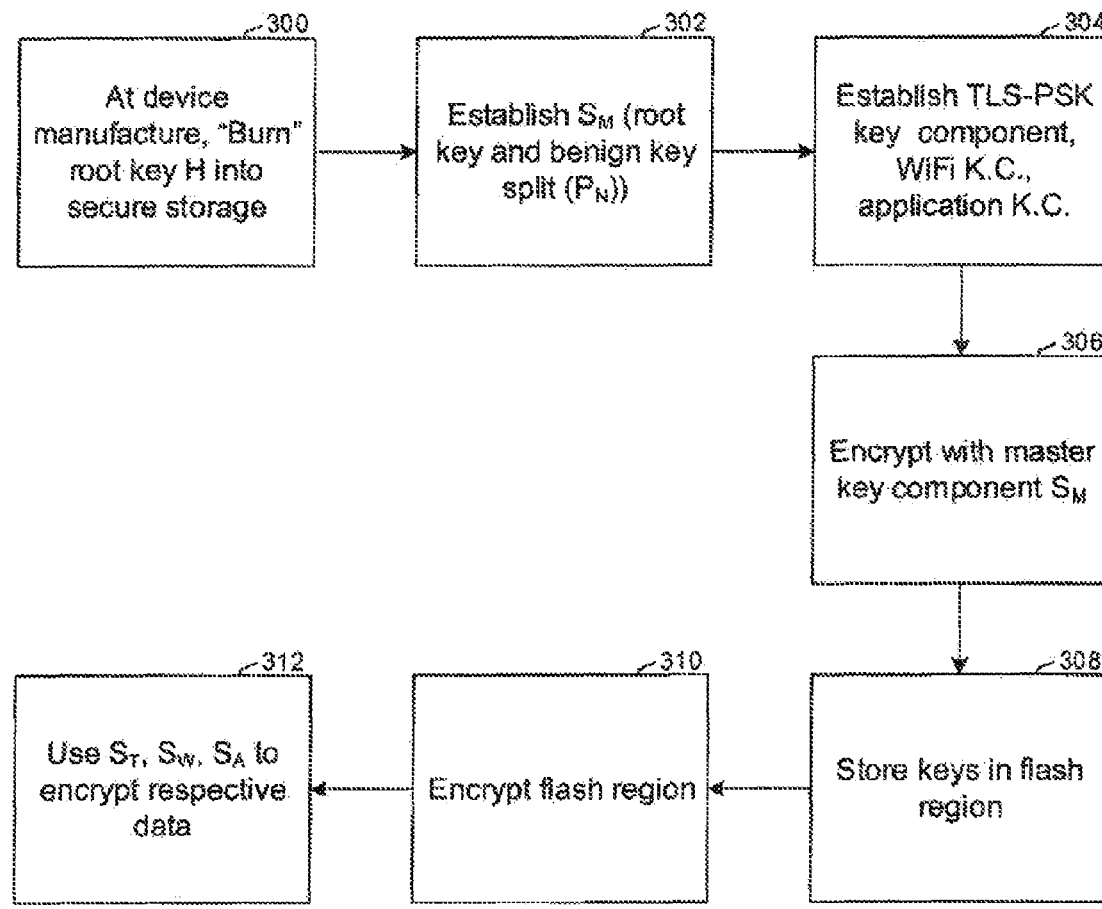
FIG. 3 is a flow chart of example logic.

FIG. 3 illustrates logic that may be employed according to present principles. Commencing at block 300, at device manufacture time the root key H is burned into persistent secure storage. Moving to block 302, the master key component $S_M$ is established by deriving it from the root key H, in one implementation by combining the root key H, such as by an XOR operation, with a pseudorandom number referred to as a benign key split, mathematically represented as follows:

M=kdf(H, $S_M$), where kdf=key derivation function, H=root key, $S_M$=master key component.

The master key is subsequently used to encrypt the other keys described below. Thus, for example, TLS-PSK=kdf(M, $S_T$).

The master key component may be generated upon the first pairing of the device 204 with another device, and may not be stored in raw form. Instead, only the component value $S_M$ may be stored. Re-pairing with new devices (or the originally paired device) will not reset the master key component. However, a "key reset" or "factory reset" based upon appropriate reset messages from the manufacturer of the device rests all the keys except the root key.

Proceeding to block 304, various other key components may be established similarly to how the master key is established, typically upon initial pairing using the principles above. These various other key components may include a Transport Layer Security (pre-shared key component) $S_T$, used for encrypting TLS messages, a Wifi configuration key component $S_W$, used for encrypting WiFi data, and one or more application verification key components $S_A$, used for verifying respective software applications. Each of these key components is then encrypted with the master key at block 306. Note that the other key components may be derived from the master key M; in an example, the key derivation function (kdf) is used in order to use M, not M itself in raw form. Similarly, the keys other than the master key that are stored in flash are not stored in raw form, but only their component values "S" are stored.

The Wifi configuration key component $S_W$ can be used to encrypt a file containing the user's WiFi configuration and passphrase information for all known WiFi networks.

In an example, the TLS key component $S_T$ is used to encrypt a secure channel with a paired device using a ciphersuite such as but not limited to TLS_PSK_WITH_AES_128_CBC_SHA or TLS_PSK_WITH_AES_256_CBC_SHA. This avoids needing to use ciphersuites with perfect forward security (DHE-based handshakes) due the ephemeral nature of secrets being passed between the devices. Also, AES-based TLS-PSH ciphersuites have very fast handshakes.

Moving to block 308, the keys described above, including the master key component, are stored in the region 206 of flash memory 208, and the region 206 is encrypted at block 310. Preferably, to encrypt this region 206 of flash 208, a random access encryption mode is used to allow partial decryption of a piece of a "blob" that otherwise would have to be entirely decrypted to retrieve only a piece. Example random access encryption modes that may be used include advanced encryption standard (AES) XEX encryption mode with tweak and ciphertext stealing (XTS) having a first tweak value equal to a key number of the derived key and a second tweak value equal to an AES block number. Or, the random encryption code can include Liskov, Rivest, Wagner (LRW) encryption, cipher block chaining-mask-cipher block chaining (CMC) encryption, electronic codebook-mask-electronic codebook (EME) encryption. There is no need for initialization vectors (IV) in these modes.

In non-limiting embodiments in which AES-XTS is used, upon first boot (or factory reset), the device 204 generates a 16 byte mask L and stores it plaintext in the first 16 bytes of the flash region 206. The encryption key used to encrypt the region 206 is the AES-XTS key, which is equal to "H" (the root key) XOR "L" (the 16 byte mask). Note that 128, 192, and 256 byte masks may alternatively be used.

The key components in flash are then used to encrypt their respective data on an as-needed basis at block 312, prior to transmitting the data to other devices. Key component exchange may be effected after first authenticating a paired device using a TLS-anon encrypted channel and then exchanging key components over that channel.

Keys may be wiped from the region 206 upon receipt of a factory reset signal from a computer associated with the manufacturer of the device (in response to, e.g., a user forgetting a password or for other reasons). The reset signal leverages the knowledge the manufacturer has of the root key, the mask derivation algorithm, and the random access encryption mode used to encrypt the region 206. Since the manufacturer possesses this knowledge, it may use appropriately encrypted, commands to wipe the keys derived from the root key and re-derive the keys.

The table below lists example key IDs and key values (32 bytes each in the example shown):

| Key ID (4 byte) | Key value (32 byte) |
|---|---|
| 0x0000000000 | L |
| 0x0000000001 | SM |
| 0x0000000002 | ST |
| 0x0000000003 | SW |
| 0x0000000100 | SA |
| 0x0000000101 | <application key> |
| 0x0000000102 | <application key> |
| . . . . . . | |

In example non-limiting implementations, the following key usage restrictions may apply.

Device manufacturer keys retrieved (decrypted) from the secure flash region 206 can only be used in RAM and must not be persisted anywhere else (use, then delete).

Application designers can request that an application key be stored/retrieved in the secure flash region 206 by the operating system of the device; the app itself is then responsible for using the key responsibly (use, then delete).

A 4-byte Key ID may be generated for each key and pre-pended to the key in the secure flash, region 206 as shown in the table above.

All application keys can be 32-byte fields; if an application only requires a 16-byte key, then it may pad the key with zeros.

Manufacturer device reserved key IDs may be: 0x00000000 through 0x000000FF; any request for these Key IDs by an application returns error.

Any application requesting a key from the secure flash region 206 shall request by Key ID.

It will be appreciated that whilst present principals have been described with reference to some example embodiments, these are not intended to be limiting, and that various alternative arrangements may be used to implement the subject matter claimed herein.

What is claimed is:

1. Device comprising:
at least one computer memory that is not a transitory signal or software per se and that comprises instructions executable by at least one processing circuitry to:
access a root key of a computing device;
use the root key of the computing device to establish at least one derived key selected from: a master key component SM, or a Transport Layer Security pre-shared key component ST, or a Wifi configuration key component SW, or an application verification key component SA;
store the at least one derived key in a first region of a memory, the first region being less than 100% of a total storage area of the memory; and
encrypt the first region using a random encryption code, wherein the random encryption code includes at least one of:
advanced encryption standard (AES) XEX encryption mode;
Liskov, Rivest, Wagner (LRW) encryption;
cipher block chaining-mask-cipher block chaining (CMC) encryption;
electronic codebook-mask-electronic codebook (EME) encryption.

2. The device of claim 1, wherein the random encryption code includes advanced encryption standard (AES) XEX encryption mode.

3. The device of claim 2, wherein the AES XEX encryption mode has tweak and ciphertext stealing (XTS) having a first tweak value equal to a key number of the derived key and a second tweak value equal to an AES block number.

4. The device of claim 1, wherein the random encryption code includes Liskov, Rivest, Wagner (LRW) encryption.

5. The device of claim 1, wherein the random encryption code includes cipher block chaining-mask-cipher block chaining (CMC) encryption.

6. The device of claim 1, wherein the random encryption code includes electronic codebook-mask-electronic codebook (EME) encryption.

7. The device of claim 1, wherein the instructions are executable to:

upon first boot or derived key reset, generate a mask L; and establish an AES-XTS key using L, the AES-XTS key being used to encrypt the first region of the memory.

8. The device of claim 1, comprising the at least one processing circuitry coupled to the at least one computer memory.

9. The device of claim 1, wherein the first region has a memory size of thirty two kilobytes (32 kB).

10. The device of claim 1, wherein the derived key includes at least two of: the master key component SM, the Transport Layer Security pre-shared key component ST, the Wifi configuration key component SW, the application verification key component SA.

11. The device of claim 1, wherein the derived key includes the master key component SM.

12. The device of claim 1, wherein the derived key includes the Transport Layer Security pre-shared key component ST.

13. The device of claim 1, wherein the derived key includes the Wifi configuration key component SW.

14. The device of claim 1, wherein the derived key includes the application verification key component SA.

15. Method comprising:
accessing a root key H of a computing device, the root key H being permanently stored on a secure hardware storage of the computing device;
using the root key H to establish a master key M by combining the root key H with a pseudorandom benign key split, represented as follows:
M=kdf (H, SM), where kdf=key derivation function, H=root key, SM=master key component;
using the master key to encrypt a Transport Layer Security pre-shared key (TLS_PSK) component ST;
using the TLS_PSK component ST to establish an encrypted communication channel with at least one paired device;
storing the master key component SM and the TLS_PSK component ST in an encrypted region of a memory; and
encrypting the first region using a random encryption code, wherein the random encryption code includes at least one of:
advanced encryption standard (AES) XEX encryption mode;
Liskov, Rivest, Wagner (LRW) encryption;
cipher block chaining-mask-cipher block chaining (CMC) encryption;
electronic codebook-mask-electronic codebook (EME) encryption.

16. The method of claim 15, wherein the random encryption code includes advanced encryption standard (AES) XEX encryption mode.

17. The method of claim 16, comprising:
upon first boot or derived key reset, generating a mask L; and
establishing an AES-XTS key using the mask L, the AES-XTS key being used to encrypt the first region of the memory.

18. Apparatus comprising:
at least one processing circuitry; and
at least one memory accessible to the at least one processing circuitry and comprising instructions executable by the at least one processing circuitry for:
deriving, from a hard-coded, unchangeable root key H, a master key M;
encrypting at least one communication key component using the master key M but not storing the master key M in an encrypted region of memory;
storing the communication key component encrypted by the master key M in the encrypted region of memory for use of the communication key component to establish a secure communication channel with a paired device;
storing a component SM of the master key M in the encrypted region of memory, the component SM of the master key M defined by: M=kdf (H, SM), where kdf=key derivation function;
encrypting the encrypted region of memory using a random encryption code wherein the random encryption code includes at least one of:
advanced encryption standard (AES) XEX encryption mode;
Liskov, Rivest, Wagner (LRW) encryption;
cipher block chaining-mask-cipher block chaining (CMC) encryption;
electronic codebook-mask-electronic codebook (EME) encryption.

* * * * *